3,816,387
PURIFICATION METHOD FOR TRH
John Wayne Cole, Deerfield, and Fred Ernest Kick, Lake Villa, Ill., assignors to Abbott Laboratories, Chicago, Ill.
No Drawing. Filed July 19, 1972, Ser. No. 273,076
Int. Cl. C07c 103/52; C07g 7/00
U.S. Cl. 260—112.5                                6 Claims

ABSTRACT OF THE DISCLOSURE

Crude TRH obtained by coupling the appropriate amino acids in proper sequence by classical method or by the solid phase method is purified by absorbing the TRH on a strongly acidic cation exchange resin, removing the liquid phase from the resin absorbate, cleaving the resin absorbate in an aqueous solution of a volatile water-soluble base with a pH between 9 and 12, removing the resin from the aqueous solution and recovering the pure TRH from the solution.

DETAILED DESCRIPTION OF THE INVENTION p-Glutamylhistidylpropline amide, commonly referred to as thyrotropin release hormone or TRH, has achieved an important role for diagnosis of thyroid dysfunction and, more recently, has also been used therapeutically as a hormone stimulant. Unfortunately, the methods known to date to make TRH synthetically produce only a tripeptide of moderate activity, unless thorough purification follows the synthesis. Among the purifications known to date, chromatography alone appears to be successful in eliminating the various salts and unreacted amines and amino acids accumulated with TRH during the synthetic assembly of the molecule. However, these chromatographic procedures are cumbersome and usually do not produce a pure material unless the product solution is passed several times over the same column or over several columns containing various packing materials.

It is therefore an object of the present invention to provide a simple process for purification of TRH; it is a further object of the present invention to provide a purification method for TRH which does not involve the use of chromatographic columns; it is a still further object of this invention to provide an economical and fast procedure for obtaining highly pure TRH from a crude reaction mixture containing this material.

These and other objects are accomplished by providing a new process of purifying TRH from a crude reaction mixture containing said TRH, consisting essentially in forming a resin absorbate by treating a clear aqueous solution of said reaction mixture with at least 0.4 g./gram of TRH of a strongly acidic cation exchange resin containing nuclear sulfonic acid exchange groups attached to a partially cross-linked styrene polymer matrix in its hydrogen form, removing the liquid phase from said resin absorbate, cleaving the resin absorbate in an aqueous solution of a volatile water-soluble base with a pH of between 9 and 12, removing the resin from said aqueous solution and recovering the TRH from said solution. For the purpose of this description, all resin amounts are based on the dry weight of said resin unless specifically indicated otherwise and the term volatile is meant to indicate a vapor pressure above that of water.

Although the above styrene polymer may be cross-linked with a variety of otherwise inert, copolymerizing materials, most commonly divinylbenzene is used for this purpose. A number of commercially available resins fulfill the above definition, e.g., the Bio-Rad Ion Exchange Resin of the AG–50 series marketed by the Bio-Rad Laboratories of Richmond, Calif., the Dowex 50–X series marketed by the Dow Chemical Company of Midland, Mich., the Duolite resin series C–20, C–25D and 25X marketed by Diamond-Shamrock of Cleveland, Ohio, the Amberlite series IR–112 to IR–124, marketed by Rohm & Haas Company of Philadelphia, Pa., the Zeocarb 225 series sold by the Permutit Company of England or the Q–100 to Q–130 series of the Ionac Chemical Co., of Birmingham, N.J. or the Nalcite HCR, HGR or HDR resins sold by Nalco Chemical Company of Chicago, Ill. Other materials that fall within the above definition are listed in "Ion Exchangers in Organic and Biochemistry" by Calmon and Kressman published by Interscience Publishers, Inc. 1957 on page 116ff. Since all of these resins have about the same cation binding capacity, they can be used interchangeably; they also may be used in any of the various grades of fineness, i.e., coarse, fine or superfine. To satisfy the required binding capacity for one gram of TRH present in the reaction mixture, a minimum of about 0.4 g. of the dry exchange resin should be used. The upper limit of the amount is mainly dictated by economical aspects; amounts above about a 10:1 ratio to the weight of TRH would be impractical from the economical viewpoint; a preferred, useful and practical range of resin to TRH lies between 0.4 and 5.0 g. of dry resin per gram of TRH.

The preferred water-soluble bases which can be used to cleave the TRH from the resin are ammonia and trimethylamine or triethylamine; other bases with a vapor pressure above that of water may be used in place thereof. The recovery of the TRH from the aqueous solution can be done by various means. A simple method consists in lyophilizing the aqueous solution containing the purified TRH. However, if desired, the aqueous solution containing the pure TRH may be worked up by other procedures such as removing the aqueous phase by vacuum distillation or similar techniques known in the art for separating solute from solvent including such methods as dialysis or the addition of a water-miscible solvent in which TRH is insoluble.

In a general embodiment, the present invention is carried out in the following fashion: the reaction mixture containing TRH is dissolved in water, filtered and the aqueous filtrate is treated with the appropriate amount of a cationic exchange resin of the type described above. The liquid phase is then discarded and the resin containing the TRH absorbed thereon is washed and subsequently placed in water and stirred for several minutes with a volatile aqueous base at a pH between 9 and 12. The resin is then removed by filtration and the remaining filtrate and wash liquors are combined and worked up by removal of the aqueous phase by distillation or through lyophilization.

To illustrate the process of the present invention, reference is made to the following examples which, however, are not intended to limit the invention in any respect.

Example 1

0.5 g. of a crude reaction mixture containing TRH, contaminating salts and dipeptide impurities was dissolved in 4 ml. of water. The solution was stirred at room temperature for a few minutes and 2.5 g. of Amberlite IR–120 which was prewashed with dilute sulfuric acid and distilled water was added. After stirring the mixture for 5 minutes, 4 ml. of methanol was added for the purpose of diluting the mixture before filtration. The solid phase was washed with aqueous methanol several times and the combined wash liquors and previous filtrate were discarded.

The resin containing the TRH absorbed thereto was then stirred with 10 ml. of 30% aqueous triethylamine for about 8 minutes and the mixture was filtered. The resin was washed with 20 ml. of aqueous methanol and subsequently twice with 30% aqueous triethylamine. All filtrates and wash liquors were combined and concentrated in vacuum to a solid residue weighing 0.33 g. Chemical and biological analysis showed that the material so obtained was TRH of 98% purity.

In a repetition of the above, no methanol was used and water was substituted therefor in each instance. The result was identical to the above with the exception that the vacuum concenration was slower.

Example 2

10 g. of crude TRH containing salts and dipeptide impurities was dissolved in 190 ml. of water and stirred for 3 hours with 70 g. of Dowex-50 (on a wet basis) which was prewashed as in the preceding example. The mixture was then filtered and the resin was washed with 600 ml. of water in 3 equal portions and subsequently with 600 ml. of methanol.

The resin absorbate was then slurried in 400 ml. of aqueous ammonia of molarity 1 for 8 hours and the mixture was then filtered. The resin was washed three times with 1 $N$ ammonia using just enough to cover the resin. The combined filtrates and washes were concentrated in vacuum to a white solid residue weighing 6.2 g. By chemical analysis it was shown that this product represented 98% pure TRH. While the initial material used in this example contained a considerable amount of dipeptides, the final product was shown to be substantially free of dipeptides.

The above defined cationic exchange resins have a dry exchange capacity of about 5 milliequivalents/g.; in their wet stage, these resins have a capacity of between 0.4 and 2.6 milliequivalents/ml. and consequently, a much larger volume of the resin has to be used. The above preferred range of 0.4–5 g. of (dry) resin per gram of TRH therefore changes to a wet ratio of 0.75 to 10 ml. per gram of TRH, depending on the amount of "swelling" or water content of the resin. The mesh size of the above resin usually is between 20 and 400; preferably, a resin with a mesh size between 20 and 100 is used which is advantageous for ease of filtration.

The resins useful for carrying out the process of this invention may differ from one another somewhat in their cross-linking: most of the resins listed above are cross-linked to between 1 and 16% with divinylbenzene although similar di-unsaturated materials may be used for the purposes of partially cross-linking the polystyrene matrix. It is usually indicated to use a larger amount of the resin when the cross-linking is in the higher range of the above ratio; the use of a styrene polymer cross-linked above 10% is less advantageous due to its reduced ability to absorb the peptide. However, if desired, such materials may be used by choosing the amount in the upper half of the above range.

In order to remove the TRH from the resin, the strength of the volatile base used determines the speed of this cleavage. With a strong base such as trimethylamine, a few minutes are sufficient to complete this step while when using a weak base such as 1 $N$ ammonia, several hours of stirring will be required. In either case, the reaction can easily be followed by assaying aliquots of the mixtues for TRH content.

The new method of purifying TRH has, aside from its simplicity and dependability, the further advantage of being extremely economical: with proper washing, the resin can be regenerated and reused for many further batches and since this new method does not require any special equipment and no expensive chemicals, the new method can be used on any scale, be it for a small laboratory batch or for commercial large production. The method is also quite capable of being converted to a continuous process which, however, will require the use of more sophisticated equipment.

We claim:

1. The process of purifying TRH from a crude reaction mixture containing said TRH, consisting essentially in forming a resin absorbate by treating a clear, aqueous solution of said mixture with at least 0.4 g. of dry weight per gram of TRH of a strongly acidic cationic exchange resin containing nuclear sulfonic acid exchange groups attached to a partially cross-linked styrene polymer matrix in its hydrogen form, removing the original liquid phase from said resin absorbate, cleaving the resin absorbate in an aqueous solution of a volatile water-soluble base with a pH of between 9 and 12, removing the resin from said aqueous solution and recovering the TRH from said solution.

2. The process of claim 1 wherein said cationic exchange resin is used in an amount of between 0.4 and 5.0 g. of dry weight per gram of TRH in said crude reaction mixture.

3. The process of claim 1 wherein said styrene polymer is cross-linked with 1–10% by weight of divinylbenzene.

4. The process of claim 1 wherein said water-soluble base is ammonia.

5. The process of claim 1 wherein said water-soluble base is triethylamine.

6. The process of claim 1 wherein the TRH is recovered from the purified solution by lyophilization.

References Cited

Flouret, J. Med. Chem., *13*, 843 (1970).
Schally et al., J. Biol. Chem., *244*, 4077 (1969).
Nair et al., Biochem., *9*, 1103 (1970).

LEWIS GOTTS, Primary Examiner

R. J. SUYAT, Assistant Examiner